(12) United States Patent
Chen et al.

(10) Patent No.: US 12,430,632 B2
(45) Date of Patent: *Sep. 30, 2025

(54) PORTABLE DEVICE LOADING MECHANISM FOR ACCOUNT ACCESS

(71) Applicant: Visa International Service Association, San Francisco, CA (US)

(72) Inventors: Yuexi Chen, Foster City, CA (US); Simon Hurry, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,696

(22) Filed: Jul. 17, 2023

(65) Prior Publication Data
US 2024/0020676 A1  Jan. 18, 2024

Related U.S. Application Data

(63) Continuation of application No. 17/049,214, filed as application No. PCT/US2018/028677 on Apr. 20, 2018, now Pat. No. 11,748,738.

(51) Int. Cl.
*G06Q 20/32* (2012.01)
*G06Q 20/02* (2012.01)
(Continued)

(52) U.S. Cl.
CPC ......... *G06Q 20/3223* (2013.01); *G06Q 20/32* (2013.01); *G06Q 20/3829* (2013.01);
(Continued)

(58) Field of Classification Search
CPC ............ G06Q 20/00–425; H04L 9/00–50
See application file for complete search history.

(56) References Cited

U.S. PATENT DOCUMENTS 5,530,232 A * 6/1996 Taylor ............... G06Q 20/20
235/487
7,346,578 B1  3/2008 Ishida et al.
(Continued)

FOREIGN PATENT DOCUMENTS

CN  101364329 A  2/2009
CN  106709713 A  5/2017
(Continued)

OTHER PUBLICATIONS

Application No. CN201880092533.3 , Office Action, 41 pages.
(Continued)

*Primary Examiner* — Chenyuh Kuo
(74) *Attorney, Agent, or Firm* — Kilpatrick Townsend & Stockton LLP

(57) ABSTRACT

Described herein are a system and techniques for updating balance information for a disbursement module on a portable device using a transaction module on that same portable device. In some embodiments, each of the transaction module and the disbursement module may be associated with a different transaction processing system. A client device may be used to interact with the transaction module of the portable device via a communication element. In some embodiments, the client device may be configured to receive an account identifier from the transaction module, generate and transmit an authorization request message to an authorization entity, and upon receiving authorization from the authorization entity, cause the transaction module on the portable device to update a balance associated with the disbursement module.

16 Claims, 7 Drawing Sheets

(51) Int. Cl.
*G06Q 20/38* (2012.01)
*H04L 9/08* (2006.01)
*H04L 9/32* (2006.01)

(52) U.S. Cl.
CPC .......... *H04L 9/0894* (2013.01); *H04L 9/3226* (2013.01); *G06Q 20/027* (2013.01)

(56) References Cited

U.S. PATENT DOCUMENTS

| | | | |
|---|---|---|---|
| 7,797,248 | B1 | 9/2010 | Bierbaum et al. |
| 9,286,636 | B2 | 3/2016 | Yu et al. |
| 9,558,489 | B2 * | 1/2017 | Hoffman .............. G06Q 20/341 |
| 9,589,260 | B2 | 3/2017 | Choi |
| 10,997,588 | B2 | 5/2021 | Locke et al. |
| 11,416,923 | B1 * | 8/2022 | Kawan ................. G07F 7/0866 |
| 11,748,738 | B2 * | 9/2023 | Chen .................... G06Q 20/341 |
| | | | 705/71 |
| 2002/0139843 | A1 | 10/2002 | Park et al. |
| 2008/0156873 | A1 | 7/2008 | Wilhelm et al. |
| 2009/0143104 | A1 | 6/2009 | Loh et al. |
| 2010/0275242 | A1 | 10/2010 | Raffard et al. |
| 2011/0196788 | A1 * | 8/2011 | Lu ....................... G06Q 20/341 |
| | | | 705/41 |
| 2012/0239567 | A1 | 9/2012 | Choi |
| 2014/0046737 | A1 | 2/2014 | Graves et al. |
| 2014/0046784 | A1 | 2/2014 | Prakash et al. |
| 2014/0229387 | A1 | 8/2014 | Chow |
| 2014/0379583 | A1 | 12/2014 | Hoffman et al. |
| 2016/0132875 | A1 | 5/2016 | Blanco et al. |
| 2021/0256495 | A1 | 8/2021 | Chen et al. |
| 2024/0232854 | A1 * | 7/2024 | Zarakas ........... G06K 19/07705 |

FOREIGN PATENT DOCUMENTS

| | | | |
|---|---|---|---|
| KR | 20090097139 A | | 9/2009 |
| KR | 20160038517 A | * | 4/2016 |
| KR | 20190116688 A | * | 10/2019 |
| WO | 2016076812 A1 | | 5/2016 |

OTHER PUBLICATIONS

"Auto Recharge and Never Run Out of Value on Your Metrocard", Adelaide Metro, Available Online at: https://www.adelaidemetro.com.au/Tickets/Metrocard/Set-up-auto-recharge, Accessed from Internet on Apr. 2, 2018, 2 pages.
"Co-Branded Multi-Application Contactless Cards for Transit and Financial Payment", Smart Card Alliance, Mar. 2008, 40 pages.
"What is Transit?", Solution Directory, Available Online at: https://visaready.visa.com/Transit_Program.html, Accessed from Internet on Apr. 2, 2018, 6 pages.
Application No. CN201880092533.3, Office Action, Mailed on May 18, 2023, 27 pages.
Application No. EP18914969.3, Extended European Search Report, Mailed on Mar. 30, 2021, 7 pages.
Application No. PCT/US2018/028677, International Search Report and Written Opinion, Mailed on Jan. 18, 2019, 13 pages.
Read et al., "A Smart Card Based Prepaid Electricity System", 2nd International Conference on Pervasive Computing and Applications, 2007.
Application No. SG11202010270T, Written Opinion, Mailed on Sep. 26, 2002, 8 pages.
Application No. SG11202010270T, Further Written Opinion, Mailed on Jan. 30, 2024, 10 pages.

* cited by examiner

PORTABLE DEVICE LOADING MECHANISM FOR ACCOUNT ACCESS

CROSS REFERENCE TO RELATED APPLICATIONS

This application is a continuation application of U.S. patent application Ser. No. 17/049,214, filed Oct. 20, 2020, which is a 371 application of International Application No. PCT/US2018/028677, Apr. 20, 2018, which are herein incorporated by reference in their entirety for all purposes.

BACKGROUND

As an increasing number of resource providers are being adapted to the use of electronic accounts, users are finding themselves with an increasing number of portable devices, each of which are associated with a different account. It is becoming advantageous to combine these portable devices in order to reduce the total number of portable devices that each user carries. However, even when multiple accounts are combined on a single portable device, those accounts are incapable of interacting with each other.

Additionally, accounts associated with closed-loop systems are notoriously difficult to maintain. Because the closed-loop system is closed, portable devices associated with these systems must often be presented to an access device of the system before a balance of the account can be updated. This is especially problematic for systems that have a limited number of, or inaccessible, access devices.

Furthermore, there are a large number of steps required to conduct an update to an account in a conventional closed loop system. For example, to conduct a load of a closed loop card such as a transit card, a user first needs to go online to a Website or access a kiosk at a transit agency. Second, the user then needs to input his credit card number or checking account number into the website or kiosk. Third, after the transaction is approved by the bank holding the accounts, the user needs to take his or her transit card and present the card to a reader at the transit agency to load the memory of the card with an updated balance. Thus, the conventional way of loading a transit card can take at least three distinct steps that may be conducted at various locations and with different devices. This can be burdensome.

In addition, in this conventional process, there is a potential security risk when the transaction has been authorized by the bank, but the user has not yet presented the transit card to the transit agency reader. An authorized person could potentially take a fraudulent transit card with the same identifiers as the legitimate transit card and present the fraudulent transit card to the reader, thereby stealing the value intended for the legitimate user.

Embodiments of the present invention address these problems and other problems, individually and collectively.

SUMMARY

Described herein are a system and techniques for updating a balance associated with a disbursement account on a portable device. In some embodiments, a portable device may include a transaction module and a disbursement module. Each of the transaction module and disbursement module may be associated with a different transaction processing system. In some embodiments, the transaction module may be associated with an open-loop system whereas the disbursement module may be associated with a closed-loop system. Hence, the portable device may be one which is capable of being used in both systems. In some embodiments, the transaction module is capable of interaction with the disbursement module in order to update information related to an account.

One embodiment of the disclosure is directed to method comprising receiving, a request to update a balance of a disbursement module on a portable device, the portable device comprising a transaction module and the disbursement module, retrieving, from the transaction module, an account identifier stored by the portable device, generating an authorization request based on the account identifier with respect to the requested update to the balance, transmitting the authorization request to an authorization entity associated with the account identifier, receiving an approval message from the authorization entity, and providing, by the client device upon receipt of the approval message to the transaction module on the portable device, instructions to update the balance of the disbursement module in accordance with the received request.

Another embodiment of the disclosure is directed to a computing system comprising: a processor; and a memory including instructions that, when executed with the processor, cause the computing system to, at least receive a request to update a balance of a disbursement module on a portable device, the portable device comprising a transaction module and the disbursement module, retrieve, from the transaction module, an account identifier stored by the portable device, generate an authorization request based on the account identifier with respect to the requested update to the balance, transmit the authorization request to an authorization entity associated with the account identifier, receive an approval message from the authorization entity, and provide, upon receipt of the approval message to the transaction module on the portable device, instructions to update the balance of the disbursement module in accordance with the received request.

Yet another embodiment of the disclosure is directed to a portable device comprising a non-transitory computer readable medium, the computer readable medium comprising a disbursement module configured to communicate with a first system to conduct a first transaction via the first system, the disbursement module comprising at least a balance component, and a transaction module configured to communicate with a second system different from the first system to conduct a second transaction via the second system, the transaction module further configured to communicate with the disbursement module to update the balance component.

Further details regarding embodiments of the disclosure can be found in the Detailed Description and the Figures.

DETAILED DESCRIPTION

Figure 1:
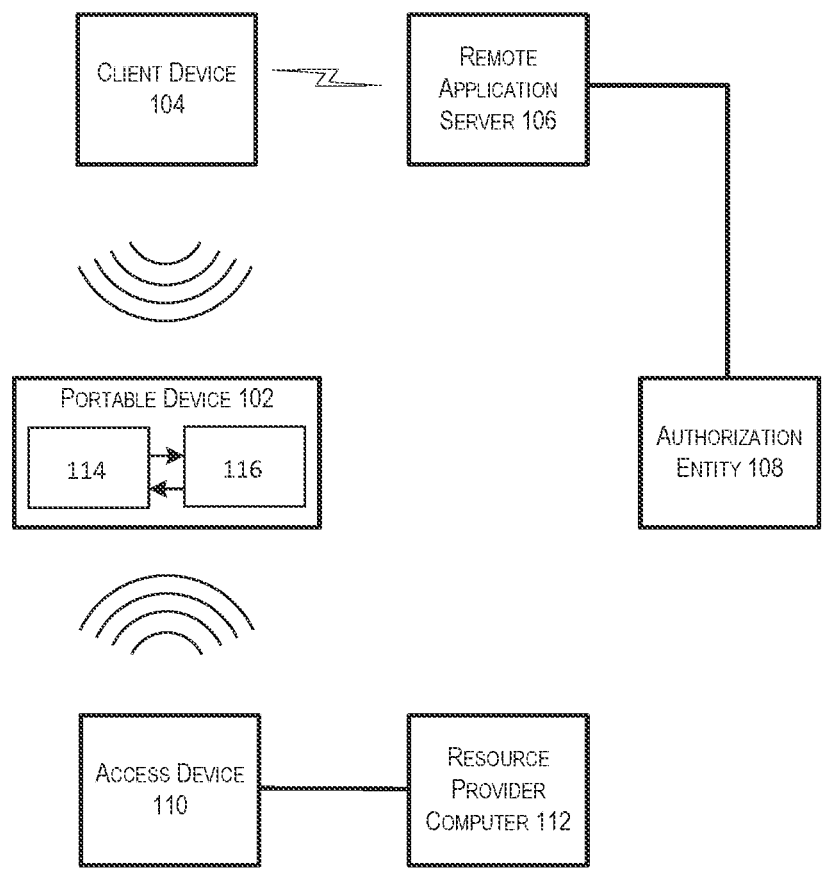
FIG. 1 depicts an illustrative example of a high-level system overview in accordance with at least some embodiments.

Embodiments of the disclosure are directed to a system and techniques for updating balance information for a disbursement module on a portable device using a transaction module on that same portable device. In some embodiments, each of the transaction module and the disbursement module may be associated with a different transaction processing system. A client device may be used to interact with the transaction module of the portable device (e.g., via a contactless element). Upon initiation of a mobile application installed upon the client device, the client device may be configured to receive an account identifier from the transaction module, generate and transmit an authorization request message to an authorization entity, and upon receiving authorization, cause the transaction module on the portable device to update a balance associated with the disbursement module.

Prior to discussing specific embodiments of the invention, some terms may be described in detail.

An "access device" may be any suitable device that provides access to a remote system. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device.

An "authorization request message" may be an electronic message that requests authorization for a transaction. In some embodiments, it is sent to a transaction processing computer and/or an issuer of a portable device to request authorization for a transaction. An authorization request message according to some embodiments may comply with ISO 8583, which is a standard for systems that exchange electronic transaction information associated with a payment made by a user using a portable device or account. The authorization request message may include an issuer account identifier (or related token) that may be associated with a portable device or account. An authorization request message may also comprise additional data elements including one or more of: a service code, a CVV (card verification value), a dCVV (dynamic card verification value), a PAN (primary account number or "account number"), a token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction. In some embodiments, the authorization request message may include a cryptogram generated using transaction-specific data. For example, a cryptogram may be generated and included in the authorization request message using a cryptographic key (i.e., a secret key), dynamic counter value, and unpredictable number. The cryptogram may be used to authenticate the authorization request message.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the resource provider's access device (e.g., POS equipment) that indicates approval of the transaction. In some embodiments, the authorization response message may include an issuer-generated cryptogram that may be used to authenticate the authorization response message. This may involve the authorization entity signing the status indicator using one or more cryptographic keys. In some embodiments, a cryptographic key used by the authorization entity to generate the issuer-generated cryptogram may be one cryptographic key of a pair of cryptographic keys used in an asymmetric cryptographic scheme. In some embodiments, the cryptographic key used by the authorization entity to generate the issuer-generated cryptogram may be a cryptographic key used in a symmetric cryptographic scheme (i.e., the same cryptographic key as used to generate the cryptogram in the authorization request message).

An "authorization entity" may be an entity that authorizes a request. Examples of an authorization entity may be an issuer, a governmental agency, a document repository, an access administrator, etc. An "issuer" may typically refer to a business entity (e.g., a bank) that maintains an account for a user. An issuer may also issue account credentials stored on a user device, such as a cellular telephone, smart card, tablet, or laptop to the user. In some embodiments, the authorization entity may be a server operated by a transaction processing network on behalf of an issuer. For example, the transaction processing network may maintain stand-in-processing (STIP) rules that are enforced by the transaction processing network to authorize requests when the issuer is unavailable.

The term "closed-loop" may refer to an entity's ability to be used within a particular ecosystem. A closed-loop system may be any system which is operated by, or on behalf of, a single entity. A closed-loop account may be any electronic account that can be used only with resource providers within a closed-loop system. An example of a closed-loop account may be a prepaid account (e.g., a gift card) that may only be redeemed at particular merchants.

A "computing device" may include any suitable device that can electronically process data. Examples of computing devices include desktop computers, mobile devices or mobile computing devices, tablet devices, etc.

A "portable device" may refer to any suitable device that may be portable. It may be used to conduct a financial transaction, such as to provide payment information to a merchant. A portable device may be in any suitable form. For example, suitable portable devices may be hand-held and compact so that they can fit into a consumer's wallet and/or pocket (e.g., pocket-sized). They may include smart cards (e.g., contactless smart cards), magnetic stripe cards, keychain devices (such as the Speedpass™ commercially available from Exxon-Mobil Corp.), etc. Other examples of portable devices include cellular phones, personal digital assistants (PDAs), pagers, payment cards, security cards, access cards, smart media, transponders, an electronic or digital wallet, wearable devices such as smart watches, fitness bands, ankle bracelets, rings, earrings, and the like. If the portable device is in the form of a debit, credit, or smartcard. Such devices can operate in either a contact or contactless mode.

The term "open-loop" may refer to an entity's ability to be used outside of a particular ecosystem. An open-loop system may be any system that incorporates entities that are not directly affiliated. An open-loop account may be any electronic account that can be used anywhere that transaction processing network brands associated with the open-loop account are accepted. Open loop accounts are typically issued in partnership with a transaction processing network provider (e.g., Visa or Mastercard).

The term "resource" generally refers to any asset that may be used or consumed. For example, the resource may be computer resource (e.g., stored data or a networked computer account), a physical resource (e.g., a tangible object or a physical location), or other electronic resource or communication between computers (e.g., a communication signal corresponding to an account for performing a transaction). Some non-limiting examples of a resource may be a good or service, a physical building, a computer account or file, or a payment account. In some embodiments, a resource may refer to a financial product, such as a loan or line of credit.

A "resource provider" may be an entity that can provide a resource such as goods, services, information, and/or access to such a resource. Examples of a resource provider include merchants, online or other electronic retailers, access devices, secure data access points, etc. A "merchant" may typically be an entity that engages in transactions and can sell goods or services, or provide access to goods or services. A "resource provider computer" may be any computing device operated by a resource provider. An example of a resource provider may be a public transportation service that provides access to transit services.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

A "transaction" may be any interaction or exchange between two or more parties. For example, a transaction may include a first entity requesting resources from a second entity. In this example, the transaction is completed when the resources are either provided to the first entity or the transaction is declined.

A "user" may include an individual. In some embodiments, a user may be associated with one or more personal accounts and/or mobile devices. The user may also be referred to as a cardholder, account holder, or consumer.

FIG. 1 depicts an illustrative example of a high-level system overview in accordance with at least some embodiments. The system in FIG. 1 may include a number of components. In some embodiments, an example system may include a portable device 102, a client device 104, a remote application server 106, an authorization entity 108, an access device 110, and/or a resource provider computer 112.

In some embodiments, the portable device 102 may be any suitable device capable of communicating with a client device 102 and an access device 110 in order to achieve the functionality described herein. In some embodiments, the portable device 102 may include an integrated circuit. In some embodiments, the integrated circuit may consist of a system-on-chip that integrates a number of components of a computer or other electronic systems (e.g., a processor and memory). In some embodiments, the integrated circuit may be a field programmable gate array (FPGA). In some embodiments, the integrated circuit may consist of an application specific integrated circuit (ASIC). An integrated circuit may contain digital, analog, mixed-signal, and/or radio-frequency functions within a single substrate.

In some embodiments, the portable device 102 may lack an internal power source. The integrated circuit in the portable device 102 may be activated upon being powered by an external device (e.g., client device 104 and/or access device 110) in order to provide at least a portion of the functionality described herein. In some embodiments, the integrated circuit of the portable device 102 may include a transaction module 114 and local disbursement module 116, each of which will be described in greater detail below.

In some embodiments, the client device 104 may be any suitable electronic device capable of performing at least a portion of the functionality described herein. The client device 104 may include a communication element that enables the client device 104 to interact with the portable device 102. In some embodiments, the client device 104 may include a mobile application that causes the client device 104 to communicate with a remote application server 106.

In some embodiments, the remote application server 106 may be any suitable computing device capable of providing backend support for the client device 104. In particular, the remote application server 106 may perform processing on behalf of a mobile application installed upon, and executed from, the client device 104. In some embodiments, the remote application server 106 may receive requests from a client device 104 and process those requests by communicating with an authorization entity 108.

In some embodiments, the authorization entity 108 may be any suitable entity capable of authorizing a transaction. The authorization entity 108 may maintain one or more accounts used to conduct transactions. One of these accounts may be associated with the portable device 102. For example, the portable device 102 may store, in memory, an account identifier that may be mapped to a particular account maintained by the authorization entity 108. In some embodiments, the account identifier may include routing information that may cause a transaction processing network to route a transaction that involves the account identifier to the authorization entity 108. The authorization entity 108, in order to determine whether a particular transaction is authorized, may determine whether or not the transaction is in compliance with various constraints associated with the account. For example, the authorization entity 108 may determine whether an amount associated with the transaction does or does not exceed an available balance associated with the account. In another example, the authorization entity may determine whether a likelihood of fraud associated with the transaction exceeds an acceptable level of risk associated with the account.

In some embodiments, the access device 110 may be any suitable device capable of communicating with the portable device 102 and the resource provider computer 112. In some embodiments, the access device 110 may include a card reader or other electronic reader capable of reading and writing data from the portable device. The electronic reader of the access device 110 may include a contactless element.

In some embodiments, the resource provider computer 112 may be any computing device operated by, or on behalf of, a resource provider. In some embodiments, the resource provider computer 112 may control access to a resource (e.g., a good or service), such as transit. In some embodiments, the access device 110 and the resource provider computer 112 may, along with various other components, be part of a closed-loop system.

By way of illustrating at least some interactions that may occur between the various components depicted in FIG. 1, consider the following use case scenario. A user having the portable device 102 may, in this scenario, wish to adjust an amount stored in local disbursement module 116. In this scenario, the user may activate a mobile application installed upon the client device 104. The user may then indicate, to the mobile application, the appropriate adjustment to be made to the local disbursement module 116. The user may then cause the transaction module 114 of the portable device 102 to communicate with the client device 104 by bringing the portable device into range of a contactless element installed upon the client device 104. In this example, the portable device 102 may communicate an account identifier to the client device 104. The client device 104 may, in turn, transmit that account identifier, along with the requested adjustment, to the remote application server 106. In some embodiments, the authorization request message may include a cryptogram generated using transaction-specific data (e.g., a secret key, dynamic counter value, and unpredictable number). The remote application server 106 may then obtain authorization for the requested adjustment using the account identifier. Once authorization has been obtained, the remote application server 106 may communicate the authorization to the client device 104. In some embodiments, the authorization response message may include a cryptogram generated by the authorization entity using the same cryptographic key (e.g., in a symmetric cryptographic scheme) or a corresponding cryptographic key from a key pair (e.g., in an asymmetric cryptographic scheme). The client device 104 may then cause the transaction module to update, after validating the authorization response, the local disbursement module 116 based on the requested adjustment.

Continuing with the illustrative example above, after the local disbursement module 116 has been adjusted, the user may then present the portable device 102 to an access device 110 in order to obtain access to some resource via a transaction. The access device 110 may communicate information about the resource, the local disbursement module 116, and/or the transaction to the resource provider computer 112 for approval. In this example, a value of the resource may be deducted from the local disbursement module 116 on the portable device 102.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communication protocol.

Figure 2:
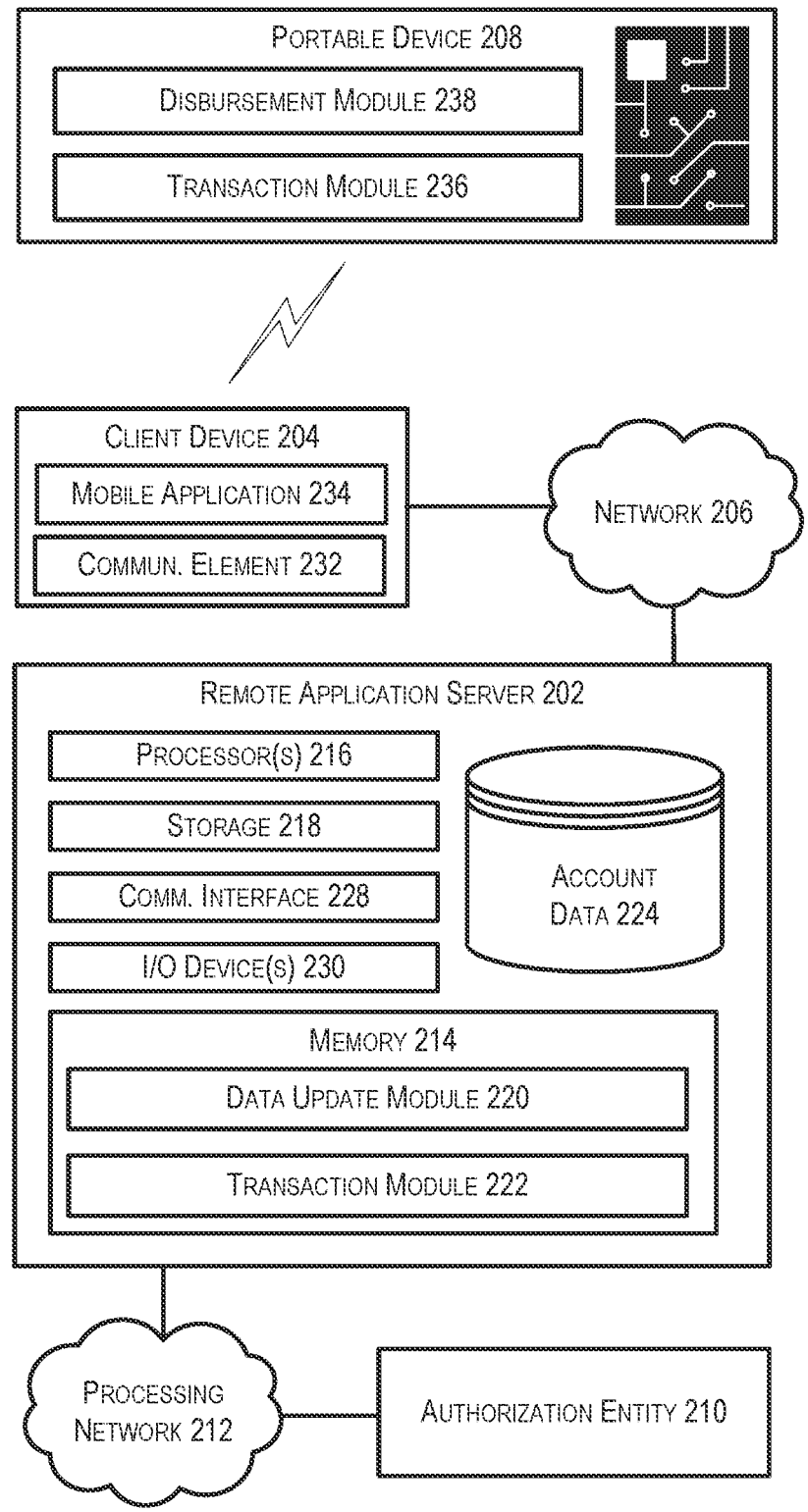
FIG. 2 depicts an example system architecture that may be implemented to provide local disbursement module adjustments to a portable device in accordance with embodiments of the disclosure.

FIG. 2 depicts an example system architecture that may be implemented to provide local disbursement module adjustments to a portable device in accordance with embodiments of the disclosure. In FIG. 2, a remote application server 202 may be in communication with a number of other computing devices. For example, the remote application server 202 may be in communication with a client device 204 via a network connection 206. Client device 204 may be an example of client device 104 depicted in FIG. 1. The client device 204 may be configured to communicate with a portable device 208. The remote application server 202 may also be in communication with a number of authorization entities 210 via a transaction processing network 212. In some embodiments, the remote application server 202 may be an example remote application server 110 of FIG. 1.

In at least some embodiments, the remote application server 202 may include at least one memory 214 and one or more processing units (or processor(s)) 216. The processor(s) 216 may be implemented as appropriate in hardware, computer-executable instructions, firmware or combinations thereof. Computer-executable instruction or firmware embodiments of the processor(s) 216 may include computer-executable or machine executable instructions written in any suitable programming language to perform the various functions described.

The memory 214 may store program instructions that are loadable and executable on the processor(s) 216, as well as data generated during the execution of these programs. Depending on the configuration and type of remote application server 202, the memory 214 may be volatile (such as random access memory (RAM)) and/or non-volatile (such as read-only memory (ROM), flash memory, etc.). The remote application server 202 may also include additional storage 218, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the remote application server 202. In some embodiments, the memory 214 may include multiple different types of memory, such as static random access memory (SRAM), dynamic random access memory (DRAM) or ROM.

Turning to the contents of the memory 214 in more detail, the memory 214 may include an operating system and one or more application programs or services for implementing the features disclosed herein including at least a module for updating disbursement module on a portable device (data update module 220) and a module for initiating authorization of a transaction (transaction module 222). The memory 214 may also include account data 224, which provides data stored in association with a user account.

In some embodiments, the data update module 220 may, in conjunction with the processor 216, be configured to receive an account identifier from a client device 204 and complete a transaction related to the account identifier. In some embodiments, the account identifier may be received by the data update module 220 in a request to update disbursement module. The request may also include other details of the requested transaction. For example, the request may also include an amount by which the account is to be updated. Upon receiving the request, the data update module 220 may execute the transaction module 222 to complete the transaction. In some embodiments, the data update module 220 may be further configured to identify one or more details associated with a user of the account based on information stored in the disbursement module 224. The one or more details may be used to complete the transaction. Upon receiving an indication that the transaction has been authorized from the transaction module 222, the data update module 220 may be further configured to communicate that authorization to the client device 204.

In some embodiments, the transaction module 222 may, in conjunction with the processor 216, be configured to conduct a requested transaction. To do so, the transaction module 222 may generate an authorization request message to obtain authorization for the transaction. Once generated, the authorization request message may be routed to an appropriate authorization entity 210 via a processing network 212. Upon receiving a response from the authorization entity 210, the transaction module 222 may complete or stop the transaction based on whether the transaction has been authorized. The transaction module 222 may then complete the transaction and output that the transaction is authorized (e.g., to the data update module 220). In some embodiments, upon authorization of the transaction, the transaction module 222 may be further configured to communicate with a resource provider associated with the disbursement module to be updated. In some embodiments, the transaction may be a push transaction. In other words, the transaction may be one in which the authorization entity pushes funds to the other entity in the transaction.

The remote application server 202 may also contain communications interface(s) 228 that enable the remote application server 202 to communicate with a stored database, another computing device or server, one or more remote devices, other application servers, and/or any other suitable electronic devices. In some embodiments, the communication interface 228 may enable the remote application server 202 to communicate with other electronic devices on a network (e.g., network 206 or processing network 212). The remote application server 202 may also include input/output (I/O) device(s) and/or ports 230, such as for enabling connection with a keyboard, a mouse, a pen, a voice input device, a touch input device, a display, speakers, a printer, etc.

In some embodiments, the client device 204 may be any electronic device capable of communicating with at least the remote application server 202 and a portable device 208. For example, the client device 204 may be a mobile phone capable of wirelessly communicating with other electronic devices. In some embodiments, the client device 204 may include a communication element 232 capable of interacting with the portable device 208. For example, the communication element 232 may be a contactless reader capable of emitting an electromagnetic signal toward, and receiving a response from, the portable device 208. In some embodiments, a mobile application 234 installed upon, and executed from, the client device 204 may activate the communication element 232 to cause it to communicate with the portable device 208.

The portable device 208 may include an integrated circuit having a memory and one or more processors. At least a portion of the integrated circuit may be dedicated to a transaction module 236, which may include some combination of hardware and software. The portable device may not include a power source, such that the integrated circuit is caused to be powered by an external source. For example, in embodiments in which the portable device 208 is a contactless device, the portable device may be brought within proximity of a client device 204. In this example, a contactless reader of the client device 204 may power the integrated circuit of the portable device 208. Once powered, the transaction module 236 may be configured to provide an account identifier to the client device. In some embodiments, the portable device 208 may include a secure element (e.g., a secure memory) that contains the account identifier and/or a cryptographic key that may be used to authenticate the account identifier. In some embodiments, the account identifier stored by the portable device may be an encrypted version of a primary account number (PAN).

In some embodiments, the mobile application 234 may be configured to, in conjunction with processors installed within the client device 204, provide a graphical user interface (GUI) to a user of the client device 204. The GUI may enable one or more functions to be performed by the mobile application 234. In some embodiments, the user of the client device 204 may elect to adjust data stored locally upon the portable device. For example, the disbursement module 238 may include a locally-maintained balance. In this example, the user may indicate an amount to add to the balance of the disbursement module 238. Upon bringing the portable device 208 into communication with the communication element 232, the mobile application may receive an account identifier from the transaction module 236. The mobile application 234 may be configured to communicate that account identifier, as well as an amount of the adjustment, to the data update module 220 of the remote application server 202. The mobile application 234 may receive, in response from the remote application server 202, an approval for the update. Upon receiving this approval, the mobile application may be further configured to communicate with the transaction module 236 to cause it to update the disbursement module 238. It should be noted that the mobile application 234 may not be capable of communicating directly with the disbursement module 238. In some embodiments, the disbursement module 238 may be associated with a specific resource provider.

Figure 3:
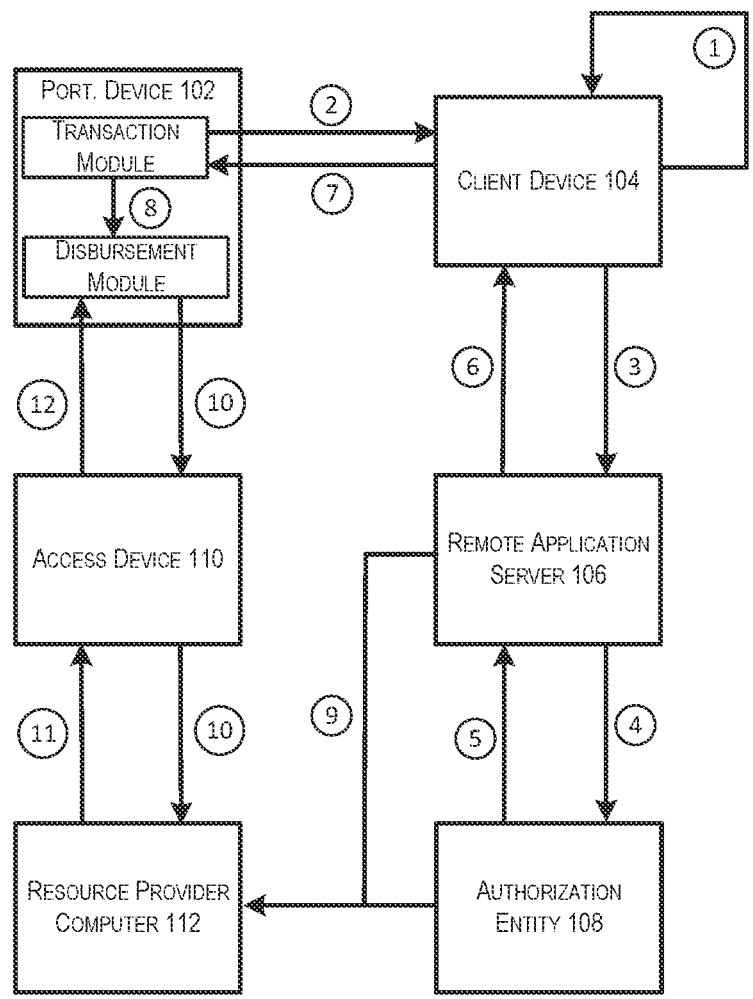
FIG. 3 depicts a flow diagram illustrating an example process for updating and using disbursement module on a portable device in accordance with at least some embodiments.

FIG. 3 depicts a flow diagram illustrating an example process for updating and using disbursement module on a portable device in accordance with at least some embodiments. In FIG. 3, the process 300 may be performed with respect to a number of different entities, including a portable device 102, a client device 104, a remote application server 106, an authorization entity 108, an access device 110, and a resource provider 112. Each of these components are examples of corresponding components depicted in FIG. 1.

In some embodiments, process 300 may begin at step 1 when a user executes a mobile application installed upon the client device 104. In some embodiments, disbursement module stored on the portable device 102 may be associated with a specific resource or resource provider. In some of these embodiments, the mobile application may be a mobile application directed to providing access to the specific resource associated with the disbursement module. For example, the disbursement module stored on the portable device 102 may be related to transit services. In this example, the mobile application may be a mobile application that enables users to purchase transit services. Upon its execution, the mobile application may cause the client device 104 to display a GUI which enables the user to select one or more details of a potential transaction to be conducted. Once the user has selected one or more details of a potential transaction, the user may be asked to position the portable device 102 so that it can be interacted with by the client device 104. For example, the user may be asked to bring the portable device 102 into range of a contactless reader installed within the client device 104. In some embodiments, the user may be required to log in or otherwise authenticate himself/herself before accessing functionality of the mobile application.

In some embodiments, upon execution, the transaction module may be configured to interact with the disbursement module in order to retrieve disbursement module information. For example, the transaction module may interact with the disbursement module to obtain an identifier associated with the disbursement module. In another example, the transaction module may obtain a balance associated with the disbursement module. The transaction module may provide at least a portion of the obtained data to the client device 104 during step 2. The client device 104 may display at least some of this information via the mobile application. For example, the client device 104, upon receiving balance information from the portable device, may display a current balance to the user. In some embodiments, a user may request a "check balance" transaction, which may consist of at least steps 1 and 2.

Upon being positioned so that it can be interacted with by the client device 104, the portable device 102, or at least an integrated circuit on the portable device 102, may be powered by the client device. An authorization request message may then be generated for the requested transaction. This may be done in a number of different ways in accordance with multiple available embodiments.

In a first example embodiment, the authorization request message may be generated by the transaction module on the portable device. In this example embodiment, the client device 104 may provide one or more transaction-specific details to the portable device. The transaction module may be configured to generate an authorization request message from those transaction-specific data as well as from data stored in memory of the portable device. For example, the authorization request message may be generated using an amount of the transaction received from the client device 104 as well as an account identifier stored on the portable device 102. In some embodiments, the transaction module may generate a cryptogram using transaction-specific data. For example, the transaction module may generate a cryptogram using a cryptographic key (i.e., a secret key), dynamic counter value, and unpredictable number. One or more elements used to generate the cryptogram may be provided by the client device 104. For example, the client device 104 may provide a date/time value that may be used to generate the cryptogram. One or more elements used to generate the cryptogram may be stored upon the portable device. For example, the portable device 102 may increment a counter value stored in memory each time that a transaction is conducted using the portable device. This counter value may be used to generate the cryptogram. It should be noted that the portable device may be provided with one or more cryptographic keys and/or account identifiers during its manufacture or during a personalization process. Once the authorization request message has been generated by the transaction module, the transaction module may be caused to transmit that authorization request message to the client device at step 2.

In a second example embodiment, the authorization request message may be generated by the client device 104, or by a remote application server 106, on behalf of the portable device 102. In these embodiments, a transaction module on the portable device 102 may be caused to transmit one or more details to the client device at step 2. For example, the transaction module may be caused to transmit an account identifier (e.g., a payment account identifier) to the client device 104 that may be used to complete a transaction. In some embodiments, the account identifier may be encrypted using some cryptographic key. This may enable the portable device 102 to be authenticated. In some embodiments, the transaction module may be caused to transmit an identifier for the disbursement module stored on the portable device 102. Upon receiving the transaction information from the portable device 102, the client device may transmit that information to a remote application server 106 at step 3.

In some embodiments, the remote application server 106 may be a server configured to provide back end support for the mobile application installed upon the client device 104. For example, the remote application server 106 may perform at least a portion of the functionality described herein as being attributed to the mobile application installed upon the client device 104. In some embodiments, the mobile application installed upon the client device 104 may be a browser application which is used to access a website hosted by the remote server application 106. In some embodiments, the remote application server 106 may maintain one or more accounts, each of which may be associated with a user or client device 104.

Upon receiving the transaction information, the remote application server 106 may initiate a transaction. To do this, the remote application server 106 may generate an authorization request message to be routed to an authorization entity 108 or it may forward the authorization request message received from the portable device to the authorization entity 108. The remote application server 106 may then provide the authorization request message to a transaction processing network to be routed to the authorization entity 108 at step 4. Upon determining whether the transaction is to be approved or declined, the authorization entity 108 may respond to the received authorization request message with an authorization response message at step 5. In some embodiments, the authorization entity may generate a cryptogram that may be used to authenticate the authorization response message. This may involve the authorization entity signing a portion of the authorization response message using a cryptographic key maintained by the authorization entity. In some embodiments, upon receiving an indication, via the authorization response message, that the transaction is approved, the remote application server 106 may transmit a response to the client device 104 at step 6.

In some embodiments, the disbursement module on the portable device 102 may consist of local disbursement module. Local disbursement module may be disbursement module for which no record is stored remotely (e.g., a balance associated with the disbursement module is stored only on the portable device 102). Steps 7 and 8 described below are used primarily to illustrate embodiments in which the disbursement module on the portable device 102 may be local in nature. However, it should be noted that steps 7 and 8 may be performed in at least some embodiments in which the disbursement module is not local.

Upon receiving the response, the client device 104 may generate and provide instructions to, or simply forward the authorization response to, the transaction module at step 7. The instructions may cause the transaction module to, after validating the authorization response, communicate with the disbursement module on the portable device 102 in order to update that data to reflect the conducted transaction at step 8. It should be noted that, in some embodiments, steps 2-8 may be performed within a very short time span. In the scenario in which the portable device 102 does not have an internal power source, the steps 2-8 may be performed entirely within the timeframe in which the portable device is being powered by the client device 104. For example, if the steps are performed using a contactless reader, then the steps 2-8 may be performed within the time that the portable device 102 is within range of the contactless reader. In situations in which the portable device 102 is removed from the proximity of the contactless reader before steps 2-8 can be completed, the user may be asked (e.g., via the mobile application) to reposition the portable device 102 so that is once more within the proximity of the contactless reader. The user may be notified that the transaction has been successfully completed via the mobile application.

At step 9, the remote application server 106 may conduct the requested transaction upon determining that the transaction has been authorized. In some embodiments, the transaction may be a push transaction in which funds are "pushed" from an account maintained by the authorization entity 108 to an account maintained by the resource provider computer 112. It should be noted that although step 9 follows steps 6-8 numerically, step 9 may be performed concurrently with, before, or after step 6. A communication that the transaction has been conducted at step 9 may be transmitted to the resource provider computer 112 by the remote application server 106 or by the authorization entity 108 in various embodiments.

In some embodiments, the disbursement module stored on the portable device 102 may be linked to an account maintained remotely by the resource provider computer 112. The transaction data provided to the resource provider computer 112 may include an indication of an identifier associated with the disbursement module on the portable device 102. In at least some of these embodiments, steps 7 and 8 as depicted may not be necessary, as the resource provider may remotely update the disbursement module based on the received transaction information.

Once the disbursement module of the portable device 102 has been updated using the techniques described herein, the portable device 102 may be used to obtain access to a resource managed by the resource provider computer 112. To do this, the portable device 102 may be positioned so that it can be interacted with by an access device 110. The access device 110 may read the disbursement module from the portable device at step 10 and transmit that disbursement module to a resource provider computer 112 in communication with the access device 110. In some embodiments, the access device 110 may also provide an indication of a requested resource to the resource provider computer 112. Upon receiving the disbursement module from the access device 110, the resource provider computer 112 may determine whether a balance associated with the disbursement module is sufficient to complete a transaction for the requested resource. Upon determining whether the balance is sufficient, the resource provider computer 112 may transmit an indication as to whether the transaction is approved or declined to the access device 110 at step 11.

In some embodiments, the disbursement module may be local disbursement module, maintained only on the portable device 102. In these embodiments, the resource provider computer 112 may receive information related to a balance associated with the disbursement module from the access device 110 and may compare that balance to an amount associated with the requested transaction. Upon receiving instructions to complete the transaction at step 11, the access device may be caused to overwrite at least a portion of the disbursement module at step 12. For example, the access device 110 may be caused to decrement a balance stored in the disbursement module by an amount associated with the requested transaction.

In some embodiments, the disbursement module may be maintained by the resource provider computer 112. In these embodiments, the resource provider computer 112 may receive an identifier associated with the disbursement module stored on the portable device 102 from the access device 110. The resource provider computer 112 may then perform a lookup using the identifier to determine whether a balance that it maintains with respect to the disbursement module is sufficient to cover the requested transaction. Upon determining whether the balance is sufficient, the resource provider computer 112 may transmit an indication as to whether the transaction is approved or declined to the access device 110 at step 11. The resource provider computer 112 may also decrement the balance maintained at the resource provider computer 112 with respect to the disbursement module by an amount associated with the transaction. In some embodiments, the new balance may be written to the disbursement module on the portable device at step 12 even though it is also maintained by the resource provider computer 112.

By way of illustrative example, consider the following use-case scenario. In this scenario, a user may wish to add $50.00 to her disbursement module balance on her portable device. To do this, the user may select an option on her smart phone, which has a contactless reader, to add $50.00 to the balance via a mobile application executed from the smart phone. The user may then be asked to bring the portable device that includes the balance into range of the contactless reader. Upon detecting the presence of the portable device, the smart phone may transmit transaction initiation information such as a transaction amount "Transaction Amount 50", a transaction currency type such as "Transaction Currency USD", a transaction date and time "Time Stamp 2018-01-01", and an unpredictable number such as "Terminal Unpredictable Number 0011223344556677" to the transaction module on the portable device.

Upon receiving the request from the client device, transaction module increment the sequential counter (though in some embodiments the transaction module may be incremented after the transaction). In this illustrative scenario, the sequential counter may originally be at 0004 and may be incremented by 1 to 0005. The transaction processing module may also generate a card unpredictable number, such as "9988776655443322." Once this data has been generated, the transaction module may concatenate each of the data into a single string. For example, the transaction module may concatenate data into the format "currency type" I "amount" "timestamp" I "terminal unpredictable number" I "counter" I "card unpredictable number." In the current scenario, this concatenated string would be "USDI00000000500012018010110011223345 56677100051998877665443322." The transaction module may then sign the concatenated string using a cryptographic key and generate a cryptogram (e.g., an authorization request cryptogram (ARQC)) with the signed string. The crytpographic key may be a UDK or "unique derived key," which may be generated from data stored on the portable device, or may have been pre-loaded by an authorizing entity such as an issuer. An examplary UDK may be formed by concatenating at least an account number, and an account dequence, and optionally inverses of these elements, and tnen encrypting the string with a master derivation key (MDK) to form an encrypted string. A portion of the encrypted string can then identified as a UDK. The advantage of using UDKs is that they are derivable and they are unique to a particular portable device. A TDES (triple DES) process may be used in the encryption/signing process.

The transaction module may then provide an authorization request message back to the smart phone that includes an account identifier (stored on the portable device for use by the transaction module), the generated cryptogram (e.g., the ARQC), and transaction information (provided by the client device).

Upon receiving the authorization request message from the portable device, the smart phone may forward the authorization request to a transaction processing network. For example, the smart phone may transmit the authorization request message to a remote application server, which may submit the authorization request message to VisaNet for processing, which may subsequently route the authorization request message to an appropriate authorization entity based on the account identifier included in the authorization request message.

Upon receiving the authorization request message, the authorization entity may validate the authenticity of the authorization request message based on the cryptogram. If validation is successful, then the transaction can proceed. If not, then the transaction can be declined.

In some embodiments, the authorization entity may use a cryptographic key common to each transaction conducted with respect to that authorization entity. In some embodiments, the authorization entity may perform a lookup based on the account identifier in the authorization request message to identify a cryptographic key unique to the portable device. For example, the authorization entity may maintain a list of symmetric cryptographic keys, each of which is associated with a different portable device. Once the authorization entity has retrieved an appropriate cryptographic key, it may validate the cryptogram. In some cases, this may involve independently generating the cryptogram and comparing the independently generated cryptogram to the cryptogram received in the authorization request message. For example, the above-described UDK can be generated by the authorization entity, and can be used to re-generate another cryptogram and compare it to the received cryptogram. Upon successful validation of the authorization request message by the authorization entity, the authorization entity may determine whether a balance of the account associated with the account identifier is sufficient to cover the requested transaction. If the account contains sufficient funds, the authorization entity generates an approved authorization response, with indicator "40" (approved) and command to load "10." The authorization entity may then generate a string of concatenated data related to the authorization. For example, the string may be in a format that includes "status indicator" I "command" I "received cryptogram." The authorization entity may then sign the string using a cryptographic key such as the UDK. An authorization response cryptogram (ARPC) may then be generated from the signed string. This authorization response cryptogram may be transmitted back to the client device along with an authorization response message and may be used to verify the authorization response message.

Upon receipt of the authorization response message, the transaction module of the portable device may validate the authenticity of the authorization response message using the ARPC. In some embodiments, this may involve independent generation of the ARPC by the transaction module, which may compare the independently generated ARPC to the one received in the authorization response message. In this example, if the two ARPCs match, then the authorization response message is valid. Upon verifying the authenticity of the authorization response message, the transaction module may cause the balance of the disbursement module to be updated in accordance with the authorized transaction.

Figure 4:
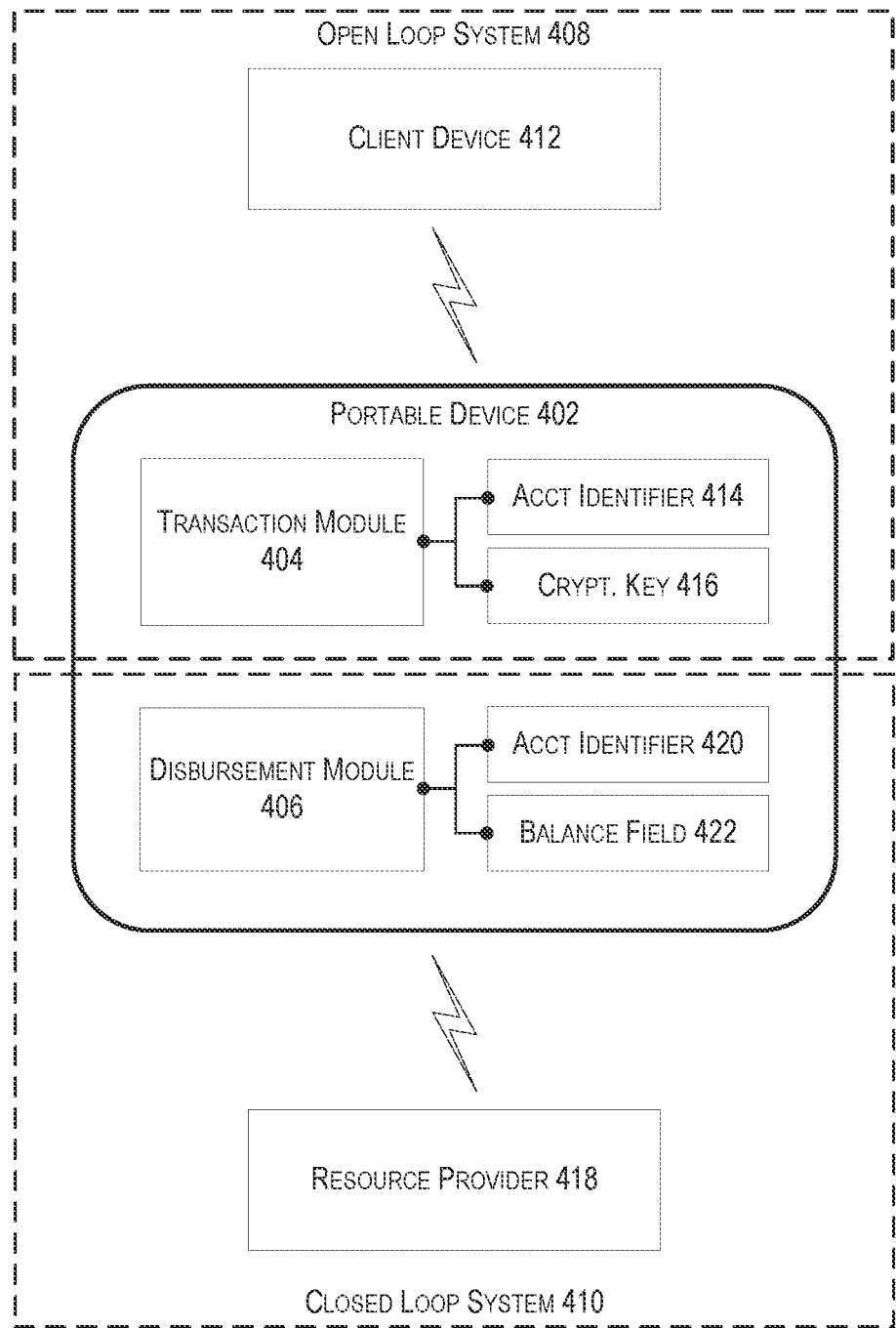
FIG. 4 depicts an illustrative example of a portable device that includes functionality directed to both an open-loop system and a closed-loop system in accordance with at least some embodiments.

FIG. 4 depicts an illustrative example of a portable device that includes functionality directed to both an open-loop system and a closed-loop system in accordance with at least some embodiments. As described elsewhere in the disclosure, a portable device 402 may include a transaction module 404 and disbursement module 406. Transaction module 404 and disbursement module 406 may be examples of transaction module 236 and disbursement module 238 depicted in FIG. 2.

In some embodiments, the transaction module 404 and the disbursement module 406, although both located on the portable device 402, may each be associated with different systems. In some embodiments, the transaction module 404 may be associated with an open-loop system 408, whereas the disbursement module 406 may be associated with a closed-loop system 410. It should be noted that in some embodiments, the transaction module 404 and the disbursement module 406 may each be associated with different open-loop systems. In some embodiments, the disbursement module may be associated with a specific resource provider 418. The portable device 402 may include a number of additional information associated with, or that may be consumed by, transaction module 404 and the disbursement module 406. In some embodiments, each of the transaction module 404 and the disbursement module 406 may be stored in separate secure memories.

When the portable device 402 is accessed via a communication element (e.g., a card reader), it may determine that an interaction is requested. Upon determining that an interaction is requested, the portable device may first determine what type of interaction is being requested. In some embodiments, this may be determined based on a format of the request or information used to initiate the interaction.

In some embodiments, the transaction module 404 may be configured to interact with the open-loop system 408 via a client device 412. In these embodiments, the transaction module 404 may have access to an account identifier that may be used to identify an account to be used in transactions involving the portable device 402 over the open-loop system 408. By way of non-limiting illustration, the account identifier 414 may be a credit card number, other primary account number (PAN), or token that may be used to conduct financial transactions. Additionally, the transaction module 404 may have access to a cryptographic key 416 that may be used to authenticate the portable device 402 to the open-loop system 408, as well as to authenticate authorization responses received by the portable device. In some embodiments, the cryptographic key used to generate the cryptogram may be one cryptographic key of a pair of cryptographic keys used in an asymmetric cryptographic scheme. Examples of an asymmetric cryptographic scheme may include, but are not limited to, Rivest-Shamir-Adleman (RSA) encryption or elliptical curve encryption (ECC). In some embodiments, the a cryptographic key used to generate the cryptogram may be a cryptographic key used in a symmetric cryptographic scheme. In other words, the same cryptographic key may be maintained by the portable device and the authorization entity, and may be used to generate the cryptogram in the authorization request message as well as to validate a received authorization response message. Examples of a symmetric cryptographic scheme may include, but are not limited to, triple data encryption standard (TDES) or advanced encryption standard (AES).

In some embodiments, the transaction module 404 may be configured to generate a cryptogram that includes one or more dynamic elements as well as the account identifier using the cryptographic key. For example, the client device 412 may provide a dynamic value (e.g., a counter value, a timestamp value, a transaction amount, a terminal unpredictable number, or any other suitable dynamic value) to the transaction module 404 of the portable device 402. In this example, the transaction module 404 may use the provided dynamic value and/or a dynamic value stored on the portable device (e.g., a counter value or card unpredictable number) when generating a cryptogram that may be used to authenticate the portable device. The authenticity of the portable device 402 may then be verified based on the generated cryptogram by an authorization entity having access to the same cryptographic key (e.g., in a symmetric cryptographic scheme) or a corresponding cryptographic key from a key pair (e.g., in an asymmetric cryptographic scheme). In some embodiments, the generated cryptogram may be verified by the client device 412 or an associated remote application server. In some embodiments, the generated cryptogram may be verified by an authentication entity of the open-loop system 408.

Upon receiving a request to perform a transaction over the open-loop system 408, the transaction module 404 may be configured to provide at least the account identifier 414. The transaction module 404 may also provide a cryptogram as described above. In some embodiments, the account identifier 414 may be encrypted prior to be provided to the client device 412 for use in a transaction. The account identifier 414 may be encrypted by the transaction module 404 or an encrypted version of the account identifier may be stored on the portable device 402 as account identifier 414. It should be noted that the transaction module 404 may be used to conduct transactions that are independent of the disbursement module 406. For example, the user may present the portable device 402 to an access device of a resource provider (e.g., a merchant) and the transaction module 404 may provide the account identifier to the access device to be used to conduct a transaction that has no relationship to the closed-loop system 410. In other words, the account identifier 414 may be used to conduct transactions at any resource provider that is capable of processing transactions supported by the authorization entity associated with the account identifier 414.

In some embodiments, the disbursement module 406 may be configured to interact with a resource provider 418 of the closed-loop system 410 (via an access device). The disbursement module 406 may include an account identifier 420 that may be used to identify an account to be used in transactions involving the portable device 402 over the closed-loop system 410. It should be noted that the account identifier 420 may be different from the account identifier 414. The disbursement module 406 may also include a balance field 422 that is populated with a current balance value for the account. In some embodiments, the disbursement module 406 may include either an account identifier 420 or a balance field 422, but not both. In some embodiments, the disbursement module 406 may include both an account identifier 420 and a balance field 422.

Upon receiving a request to perform a transaction over the closed-loop system 410, the disbursement module 406 may be configured to provide at least the account identifier 420, the balance field 422, or both. In some embodiments, the disbursement module 406 may be local in nature, in that it may not be separately maintained by an external entity (e.g., the resource provider 418). In some embodiments, the account identifier 420 may correspond to an account maintained by the resource provider 418. These separate embodiments are described in greater detail elsewhere in the disclosure. In either embodiment, an available balance may be updated after the transaction to reflect an amount of the amount of the transaction. It should be noted, additionally, that a balance of a disbursement module 406 may be updated via the closed-loop system 410. For example, the portable device 402 may be presented to an access device of the resource provider 418, which may add some amount to the balance associated with the disbursement module 406 based on a separately conducted transaction.

In some embodiments, although associated with separate systems, the transaction module 404 is capable of interaction with the disbursement module 406. For example, the transaction module 404 may retrieve information from the disbursement module 406 to be provided to the client device 412 (e.g., an account balance or account identifier 420). In another example, upon receiving instructions from the client device 412, the transaction module 404 may cause the balance field 422 of the disbursement module 406 to be updated.

Figure 5:
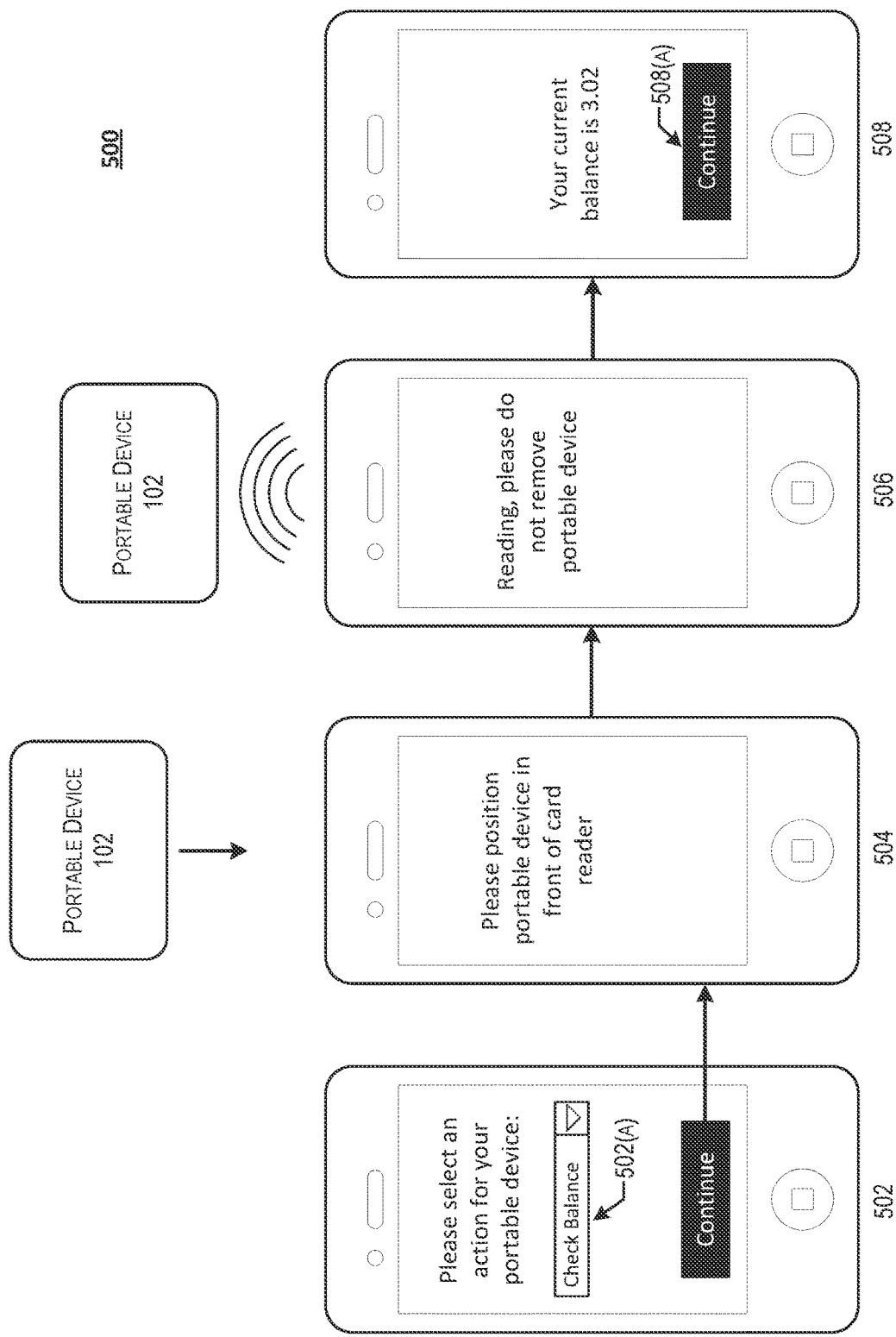
FIG. 5 depicts a process by which details associated with disbursement module of a portable device may be provided to a user in accordance with at least some embodiments.

FIG. 5 depicts a process by which details associated with disbursement module of a portable device may be provided to a user in accordance with at least some embodiments. For illustrative purposes, the process 500 is depicted as a series of graphical user interfaces (GUIs).

Upon execution of a mobile application installed upon a client device (e.g., a mobile phone), the mobile application may enable a variety of functions to be performed with respect to the portable device. In some embodiments, the mobile application may present a GUI similar to GUI 502, in which a user may be given the ability to select a function to perform. In some embodiments, the user may be presented with a list of functions 502(*a*), from which the user is able to select a particular function.

Upon receiving a selection of a function to be performed with respect to the portable device, a GUI similar to GUI 504 may be presented to the user with instructions to position the portable device 102 so that it can be interacted with by the client device. In some embodiments, the client device may include a contactless element capable of interacting with the portable device wirelessly. In some embodiments, the client device may include a card reader into which the portable device 102 may be inserted.

Upon detecting that the portable device has been positioned to enable interaction with the client device, the portable device 102 may be configured to provide one or more pieces of information. While the client device is retrieving information, a GUI similar to GUI 606 may be presented indicating that the portable device 102 should not be moved out of position. By way of illustration, the selected function may be a function to check a balance of the disbursement module stored on the portable device 102. In some embodiments, the client device may receive the requested balance from the portable device 102. In some embodiments, the client device may receive an identifier associated with the disbursement module stored on the portable device. In these embodiments, the client device may communicate with a resource provider associated with the disbursement module to obtain the balance for that disbursement module. For example, the client device may transmit a request to a computer operated by the resource provider that includes the received identifier.

Upon receiving the requested data from the portable device 102, a GUI similar to GUI 508 may be presented to the user which displays the received information in accordance with the selected function. In some embodiments, the user may be presented with an option 508(*a*) that, when selected, repeats the process 500 by returning to GUI 502.

Figure 6:
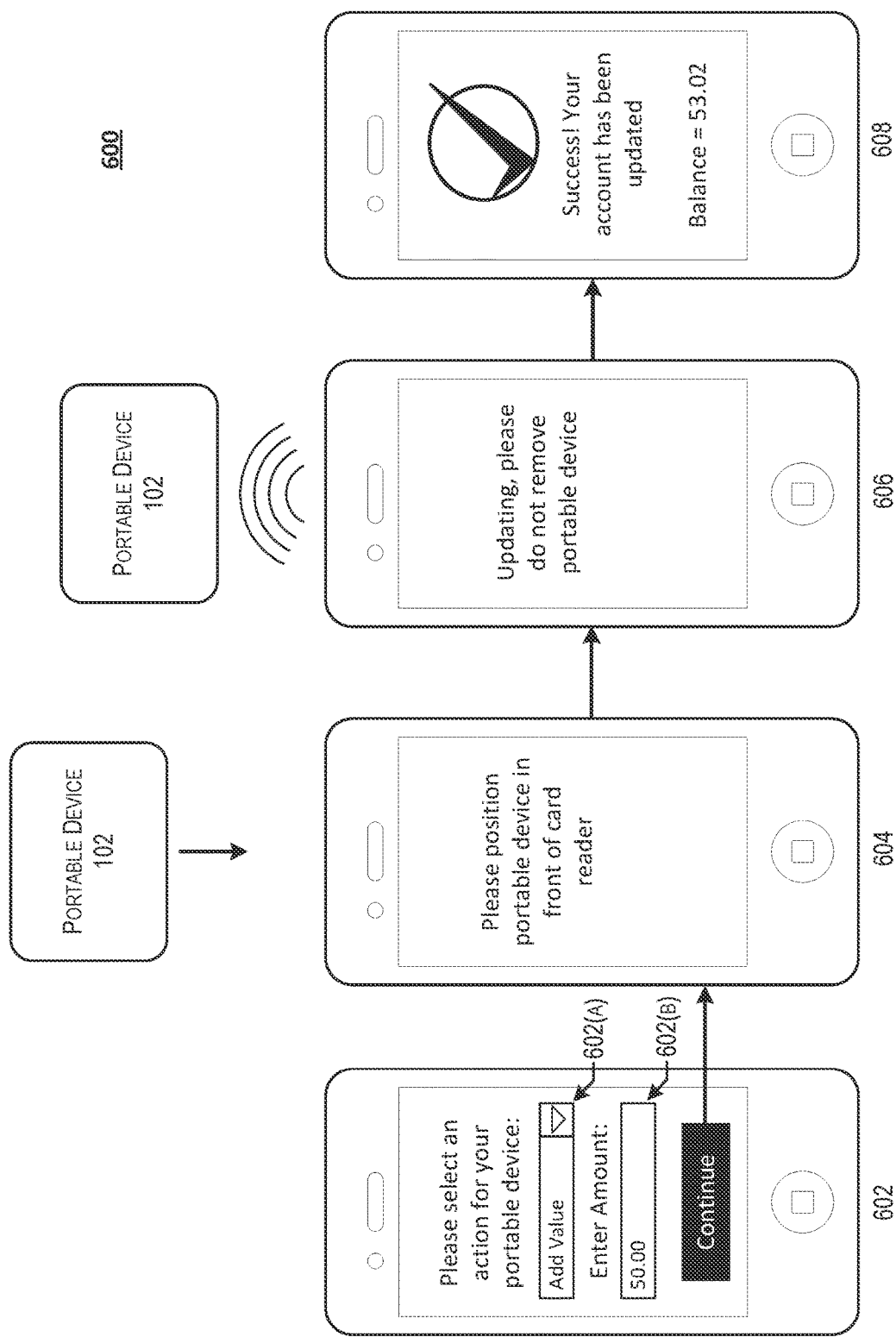
FIG. 6 depicts a process by which one or more details associated with disbursement module of a portable device may be updated in accordance with at least some embodiments.

FIG. 6 depicts a process by which one or more details associated with disbursement module of a portable device may be updated in accordance with at least some embodiments. Similar to the process depicted in FIG. 5, the process 600 is depicted as a series of GUIs.

As described above, upon execution of a mobile application installed upon a client device (e.g., a mobile phone), the mobile application may enable a variety of functions to be performed with respect to the portable device. In some embodiments, the mobile application may present a GUI similar to GUI 602, in which a user may be given the ability to select a function to perform as depicted at 602(*a*). In some embodiments, upon selection of a particular function, the user may be requested to provide additional details related to the function to be performed as depicted at 602(*b*).

Upon receiving a selection of a function to be performed with respect to the portable device, a GUI similar to GUI 604 may be presented to the user with instructions to position the portable device 102 so that it can be interacted with by the client device. In some embodiments, the client device may include a contactless element capable of interacting with the portable device wirelessly. In some embodiments, the client device may include a card reader into which the portable device 102 may be inserted.

Upon detecting that the portable device has been positioned to enable interaction with the client device, the requested function may be initiated automatically (e.g., without further interaction by the user). To do this, the portable device 102 may be configured to provide one or more pieces of information. In some embodiments, the client device may first provide data to the transaction module of the portable device. For example, if the selected function is a function to perform a transaction using the portable device 102, the client device may provide a dynamic data value to be used by the portable device 102 to generate a cryptogram that may be used to complete that transaction. In some embodiments, GUI 606 may be presented until the transaction is completed in its entirety (e.g., the process 300 as described with respect to FIG. 3) and the disbursement module on the portable device 102 has been caused to be updated. Upon completion of the selected transaction, the client device may display a GUI similar to GUI 608, in which the user is notified as to the status of the transaction.

Figure 7:
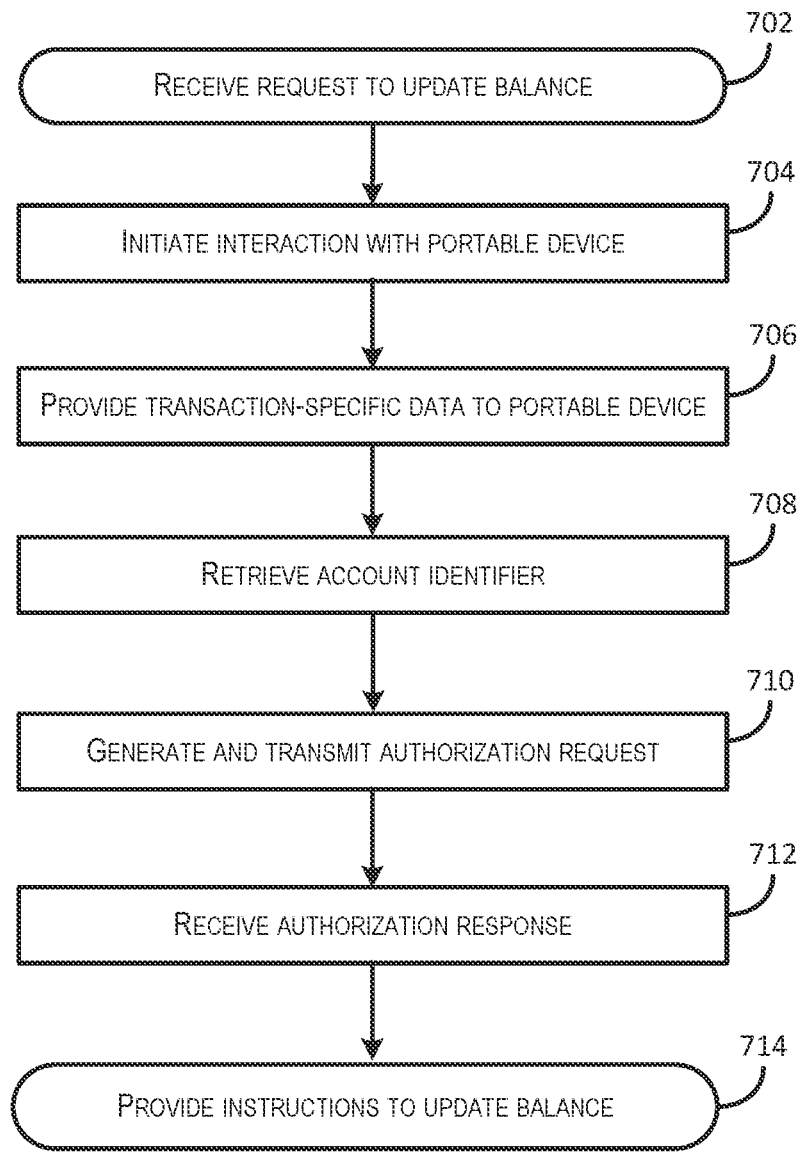
FIG. 7 depicts a flow diagram illustrating an example process for updating a balance associated with a disbursement module in accordance with at least some embodiments.

FIG. 7 depicts a flow diagram illustrating an example process for updating a balance associated with a disbursement module in accordance with at least some embodiments. Some or all of the process 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Process 700 may be performed by an example client device 204, a remote application server 202, and various other components, each of which is depicted with respect to FIG. 2, or can be performed using distributed processing techniques so that a combination of a client device 204, a remote application server 202 and/or various other components, each of which performs only part of the overall process, cooperate to perform the overall process 700.

Process 700 may begin at 702, when a request is received to update a balance associated with a disbursement module of a portable device. In some embodiments, the request may be received via a mobile application installed upon, and executed from, a client device. In some embodiments, the disbursement module, as well as the mobile application, may be associated with a particular resource provider or a particular type of resource (e.g., transit services). For example, the disbursement module may be associated with a first system, which may be a closed-loop system (e.g., a prepaid system).

At 704, the process may involve initiating interaction with a portable device. In some embodiments, this may involve positioning the portable device so that it may be interacted with by a client device. For example, the portable device may need to be brought into proximity of a contactless reader. In another example, the portable device may need to be inserted into a card reader of the client device. In some embodiments, interactions between the client device and the portable device may be initiated upon the client device detecting the presence of the portable device or vice versa.

At 706, the process may involve providing transaction-specific data to the portable device. In some embodiments, the client device may provide the transaction module of the portable device with details related to the transaction (e.g., an amount of the transaction). In some embodiments, the client device may provide the transaction module of the portable device with a dynamic data value (e.g., a time/date or counter value) from which the transaction module may generate a cryptogram for the transaction. The transaction module may be associated with a particular transaction processing network and/or authorization entity. For example, the transaction module may be associated with a second system, which may be an open-loop system (e.g., a credit card processing system).

At 708, the process may involve retrieving an account identifier. This may involve the transaction module retrieving an account identifier from a secure memory of the portable device. In some embodiments, the account identifier may be encrypted by the transaction module. In some embodiments, the account identifier may be encrypted before it is stored on the portable device.

At 710, the process may involve generating and transmitting an authorization request message to an authorization entity. In some embodiments, the account identifier, along with an amount of the balance update indicated in the request, may be used to generate an authorization request message. In some embodiments, the client device may receive a cryptographic key from the transaction module which may be used to generate at least a portion of the authorization request message. In some embodiments, the cryptographic key may be a public key of an asymmetric key encryption schema. Once generated, the authorization request message may be transmitted to the appropriate authorization entity via a transaction processing network.

At 712, the process may involve receiving an authorization response message from the authorization entity. The authorization response message may include an indication that the transaction is either approved or declined. The authorization response message, or some portion thereof, may be transmitted to the client device. In some embodiments, upon receiving an indication that the transaction is approved, the process may also involve initiating a transaction to move funds from an account maintained by the authorization entity to a resource provider associated with the disbursement account.

At 714, the process may involve providing instructions to the transaction module to update the balance associated with the disbursement module. In some embodiments, this may be done by the client device before the portable device is removed from a position in which the client device is able to interact with the portable device. The transaction module, upon receiving the instructions from the client device, may update the balance in accordance with the received request on the portable device.

In some embodiments, the transaction module may be provided with an issuer-generated cryptogram that may be used to authenticate the authorization response message. As described elsewhere, an issuer-generated cryptogram may be generated using a cryptographic key maintained by the authorization entity. In some embodiments, the authorization entity may sign a portion of the authorization response message using the cryptographic key (e.g., the status indicator). In these embodiments, the signed portion of the authorization response message may be verified by the receiving entity. Performing this step ensures that the transaction was actually authorized by the authorization entity prior to incrementing a balance of the portable device.

Embodiments of the disclosure provide for a number of technical advantages and improvements over conventional systems. For example, in order to update an account balance in conventional closed-loop systems a user typically needs to present the portable device to an access device associated with that closed-loop system. Unlike conventional systems in which balances of closed-loop accounts are updated, the current disclosure enables such an account balance to be updated without the need for the portable device to be presented to an access device associated with the resource provider. Instead, a user is given the ability to update an account balance associated with a closed-loop system via his or her mobile phone or other suitable client device.

Furthermore, embodiments of the invention provide for improved systems and methods, because they reduce the number of steps relative to conventional systems and methods, while making the process more convenient and secure. For example, as explained above, using the particular architecture and arrangement of elements described herein, the user really only needs to perform one physical interaction (e.g., the presentation of the user's portable device to the user's client device) in order to load a disbursement module with value to conduct an interaction with an access device to access a resources, compared to performing three separate interactions in conventional systems. Also, since the loading of the portable device occurs while the legitimate user is in possession of it at the time of load authorization, it is not possible for an unauthorized person to use a counterfeit closed loop card to fraudulently obtain value that is intended for the legitimate user.

A computer system may be used to implement any of the entities or components described above. The subsystems that may be included include system bus. Additional subsystems include a printer, keyboard, storage device, and monitor, which are coupled to display adapter. Peripherals and input/output (I/O) devices, which couple to I/O controller, can be connected to the computer system by any number of means known in the art, such as a serial port. For example, I/O port or external interface can be used to connect the computer apparatus to a wide area network such as the Internet, a mouse input device, or a scanner. The interconnection via system bus allows the central processor to communicate with each subsystem and to control the execution of instructions from system memory or the storage device, as well as the exchange of information between subsystems. The system memory and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within one or more computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one," unless specifically indicated to the contrary.

What is claimed is:

1. A portable device comprising:
   an integrated circuit including a processor and a non-transitory computer readable medium storing a transaction module, a disbursement module and instructs that, when executed by the processor, causes the processor to perform the steps comprising:
   storing, in the transaction module, a first second account identifier;
   storing, in the disbursement module, a second account identifier and a balance component, wherein the balance component stores a balance, wherein the disbursement module is associated with a resource provider;
   communicating, via the transaction module, with a first system, wherein the first system is a client device;
   conducting, via the transaction module, a first transaction with the first system by providing the first account identifier and the balance associated with the disbursement module to the first system;
   receiving, via the transaction module, instructions from the first system, wherein the instructions comprise an adjustment amount;
   updating, via the transaction module, the balance stored in the balance component on the disbursement module by the adjustment amount based on the instructions received from the first system;

communicating, via the disbursement module, with a second system, wherein the second system is an access device associated with the resource provider;

conducting, via the disbursement module, a second transaction with the second system by providing the second account identifier and the updated balance to the second system, wherein the access device decrements the updated balance by an amount associated with a good or service provided by the resource provider; and receiving, via the disbursement module, a decremented updated balance value from the access device, wherein the disbursement module stores the decremented updated balance in the balance component.

2. The portable device of claim 1, wherein the second system is a closed-loop, transit system.

3. The portable device of claim 1, wherein the first system is associated with an open-loop system.

4. The portable device of claim 1, wherein at least one of the transaction module or the disbursement module is activated upon the portable device being powered by an external source.

5. The portable device of claim 1, wherein the integrated circuit is one of a system-on-chip, field programmable gate array, or application specific integrated circuit.

6. The portable device of claim 1, the portable device is a contactless card.

7. The portable device of claim 1, wherein the first system is a mobile phone.

8. The portable device of claim 1, wherein the portable device, via the transaction module, communicates with the first system via NFC.

9. The portable device of claim 1, wherein the portable device, via the transaction module, retrieves balance data from the balance component of the disbursement module, and transmits the balance data to the first system.

10. The portable device of claim 1, wherein the portable device, via the transaction module, generates an authorization request message and transmits the authorization request message to the first system.

11. A method using a portable device comprising an integrated circuit comprising a transaction module and a disbursement module, the method comprising:

storing, by the portable device, a first account identifier in the transaction module of the portable device;

storing, by the portable device, a second account identifier and a balance component in the disbursement module of the portable device, wherein the balance component stores a balance, wherein the disbursement module is associated with a resource provider;

communicating, by the portable device via the transaction module, with a client device;

conducting, by the portable device via the transaction module, a first transaction with the client device by providing the first account identifier and the balance associated with the disbursement module to the client device;

receiving, by the portable device via the transaction module, instructions from the client device, wherein the instructions comprise an adjustment amount;

updating, by the portable device via the transaction module, the balance stored in the balance component of the disbursement module by the adjustment amount based on the instructions received from the client device;

communicating, by the portable device via the disbursement module, with an access device, wherein the access device is associated with the resource provider;

conducting, by the portable device via the disbursement module, a second transaction with the access device by providing the second account identifier and the updated balance to the access device associated with the resource provider, wherein the access device decrements the updated balance by an amount associated with a good or service provided by the resource provider; and receiving, by the portable device via the disbursement module, a decremented updated balance from the access device, wherein the disbursement module stores the decremented updated balance .

12. The method of claim 11, further comprising:

providing, by the portable device via the transaction module, a cryptographic key stored in the portable device to the client device.

13. The method of claim 11, further comprising:

receiving, by the portable device via the transaction module and from the client device, transaction-specific data, wherein the transaction module of portable device generates a cryptogram using the transaction specific data and a cryptographic key stored in the portable device.

14. The method of claim 11, wherein the resource provider is associated with a transit system operator.

15. The method of claim 11, wherein each of the transaction module and the disbursement module are associated with different systems.

16. The method of claim 11, wherein the first account identifier is a primary account number or a payment token, which is a substitute for the primary account number.

* * * * *

UNITED STATES PATENT AND TRADEMARK OFFICE
CERTIFICATE OF CORRECTION

| | |
|---|---|
| PATENT NO. | : 12,430,632 B2 |
| APPLICATION NO. | : 18/353696 |
| DATED | : September 30, 2025 |
| INVENTOR(S) | : Yuexi Chen and Simon Hurry |

It is certified that error appears in the above-identified patent and that said Letters Patent is hereby corrected as shown below:

In the Claims

In Claim 1, Column 22, Line 48, delete "second".

Signed and Sealed this
Sixteenth Day of December, 2025

John A. Squires
*Director of the United States Patent and Trademark Office*